Nov. 1, 1966 J. L. GILLILAND ETAL 3,283,176
STEP FUNCTION GENERATOR
Filed July 9, 1964
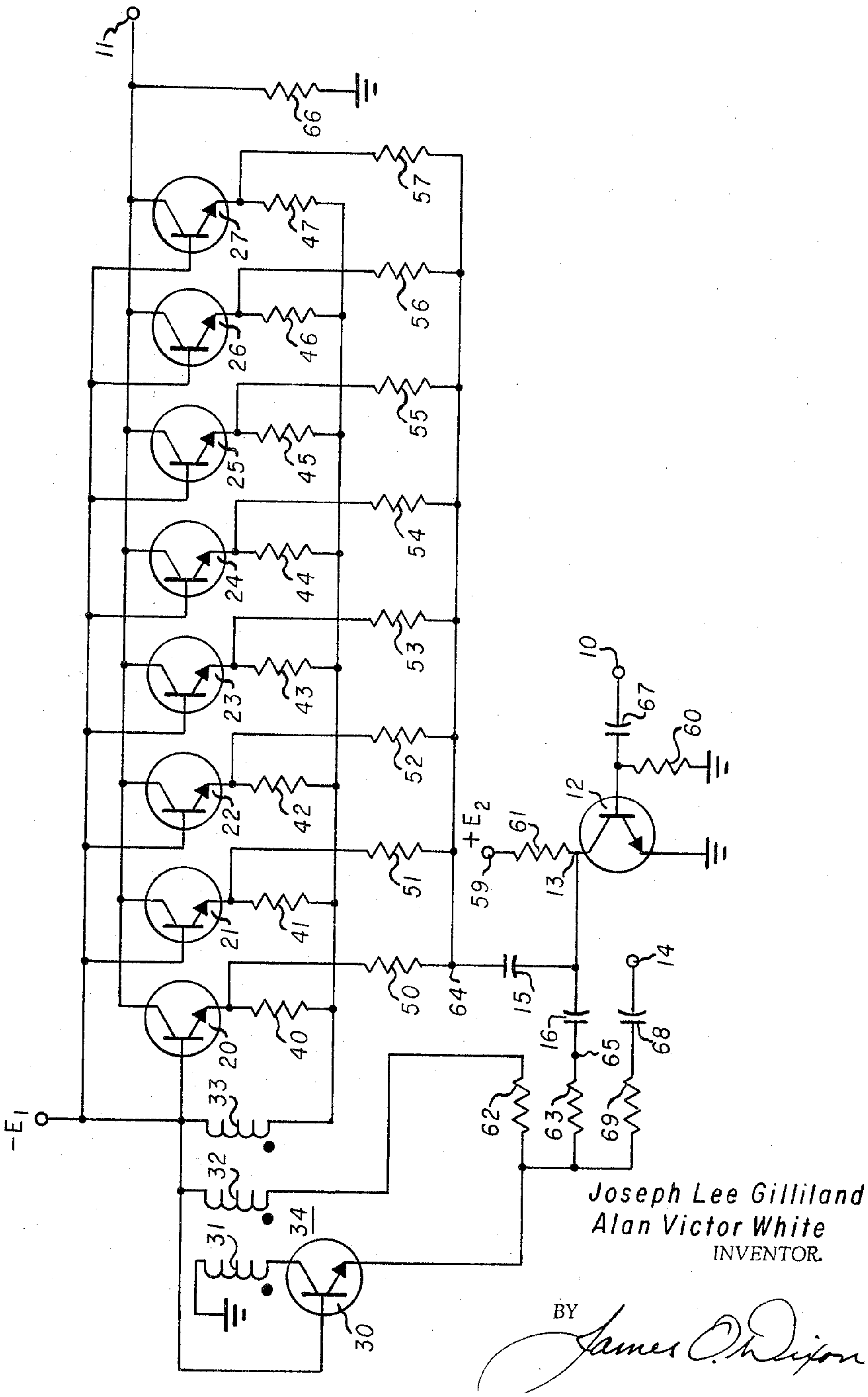
Joseph Lee Gilliland
Alan Victor White
INVENTOR.
BY James O. Dixon United States Patent Office 3,283,176
Patented Nov. 1, 1966

3,283,176

STEP FUNCTION GENERATOR

Joseph Lee Gilliland and Alan Victor White, both of Houston, Tex., assignors to Texas Instruments Incorporated, Dallas, Tex., a corporation of Delaware Filed July 9, 1964, Ser. No. 381,462
9 Claims. (Cl. 307—88.5)

This invention relates to a pulse generating circuit, and more particularly to a "step function" generating circuit, capable of producing an output pulse of comparatively short rise time and long duration.

An ideal step function exhibits an instantaneous switching from a first constant value to a second constant value, the second value being maintained thereafter. In a practical step function generator, of course, the duration of the switching, i.e., the rise time of the step, is not zero and normally only so short as the purpose of the generator requires. The duration of the second constant value is similarly dictated by application requirements. It is a feature of a step function generator according to the present invention that the pulse generated thereby has a markedly improved duration in relation to its rise time.

A principal object of the invention is the provision of a pulse generator that produces a pulse of extremely fast rise time and comparatively long duration.

Another object of the invention is the provision of a pulse generator that produces a pulse having a substantially flat wave form between the rise and fall thereof.

It is a feature of the invention that the generated pulse can be terminated at any time prior to its maximum duration.

Other objects, features, and advantages of the invention will be apparent from the following detailed description taken in conjunction with the appended claims and attached drawing in which the sole figure is a schematic diagram of a step function generator according to the invention.

Referring now to the drawing, the input at terminal 10 is normally a D.C. level, with a small voltage pulse rising thereabove when a step function is to be generated. In response to the input pulse, the generator output voltage at terminal 11 switches from zero or ground potential to a negative value. The output voltage is returned to zero by the application of a cutoff pulse at terminal 14, but it would lapse back to zero after a given period without the cutoff pulse.

Prior to the application of the input pulse at terminal 10, avalanche transistor 12 draws only a minute current. Since mixer transistors 20–27 and transistor 30 are likewise at cutoff, only a small leakage current is flowing through resistors 40–47 and 62. The voltage at terminal 64 of capacitor 15 is approximately $-E_1$, established through the path comprised of winding 33, resistors 40–47, and resistors 50–57. The voltage at terminal 65 of capacitor 16 is likewise approximately $-E_1$, established through winding 32, resistors 62 and 63. The voltage at the other terminal of each capacitor is the relatively high potential at the collector 13 of transistor 12. The output current of the step function generator through the load, represented by resistor 66, is also only a small leakage current at this time.

Source voltage $+E_2$ at terminal 59, base resistor 60, and collector resistor 61 of avalanche transistor 12 are chosen so that a small pulse, applied at the base thereof, will initiate avalanche operation, which will continue so long as capacitors 15 and 16 provide sufficient discharge current into the collector thereof. As said discharge current becomes insufficient to maintain avalanching, avalanche transistor 12 will lapse back to its low conduction operation.

When the pulse voltage is applied through capacitor 67 to the base of transistor 12 and becomes large enough to start avalanche operation, said transistor begins to conduct heavily, with a large, sharp drop in the voltage at collector 13. Capacitor 15 discharges heavily into the collector of transistor 12, drawing current through resistor 66, through the collector-emitter path of transistors 20–27, and through resistors 50–57 to said capacitor, current also flowing from the source of potential $-E_1$ through the base-emitter path of transistors 20–27, then through resistors 50–57. The magnitude of the discharge current is such that mixer transistors 20–27 are switched into saturation. Accordingly, the collector voltages of said mixer transistors at terminal 11 sharply switch to a negative value, very nearly $-E_1$. A plurality of mixer transistors is employed in the generator of the drawing in order to increase the load which said transistors can supply above that of which a single transistor is capable; the number of mixer transistors is thus a matter of design choice. In a manner similar to transistors 20–27, transistor 30 is switched into saturation as capacitor 16 discharges, drawing current through the collector and base thereof and thence through resistor 63.

As transistor 12 reaches its peak conduction and begins to return to its quiescent state, the voltage at collector 13 begins to rise from the value to which it sharply dropped. To illustrate the comparative rise and fall times of the negative voltage pulse thus formed at the collector 13 of transistor 12, said pulse might rise to its maximum value in 1 nanosecond and fall back to 10% of that value in 20 more nanoseconds. The capacitor discharge current pulses applied to the emitters of transistors 20–27 and transistor 30 similarly have a fast rise time followed by a slower decay as the discharge currents of capacitors 15 and 16 begin to decrease. As the current pulses begin to decay, slackening the emitter drive of transistors 20–27 and transistor 30, the voltage at terminal 11 would begin to become less negative except for the action of the blocking oscillator comprised of transistor 30 and windings 31, 32 and 33 of transformer 34. Considering mixer transistors 20–27 as an amplifier, the blocking oscillator generates a supplemental input therefor to maintain the amplifier output at the level established in response to the pulse at collector 13.

When blocking oscillator transistor 30 is driven into saturation by the sharp leading edge of the current pulse through capacitor 16, its collector voltage accordingly switches to a negative value, very nearly $-E_1$. The sharp drop in collector voltage is coupled by primary winding 31 of transformer 34 to secondary winding 32, causing the voltage at the junction of winding 32 and resistor 62 to assume a value more negative than $-E_1$. The drive thus applied by winding 32 through resistor 62 to the emitter of transistor 30 maintains said transistor in saturation, which, in turn, results in the continued coupling of driving voltage to secondary winding 32 from winding 31. Hence transistor 30 remains in saturation for a relatively long time, for example, 20 microseconds, until the collector current thereof has increased to a value which causes the collector voltage abruptly to become less negative than its saturation value, thereby removing the drive provided by winding 32, and cutting transistor 30 off.

From the time that transistor 30 is switched into saturation by the leading edge of the current pulse through capacitor 16, and resulting in the sharp voltage step across windings 31 and 32, a voltage step, almost as sharp, is induced in secondary winding 33 of transformer 34 and applied to the emitters of transistors 20–27 through resistors 40–47. However, the current through transistors 20–27 due to the driving voltage of winding 33, cannot increase to full value as fast as the voltage across said winding increases, because of the inductance of transformer 34. Yet, the increase of the current through winding 33 is sufficiently fast to maintain transistors 20–27 in saturation despite the decay of the discharge current pulse through capacitor 15. In order to obtain at terminal 11 a wave form which is substantially flat after the initial switching to saturation of transistors 20–27, the values of resistors 50–57 and capacitor 15 are so chosen that the capacitor discharge current applied through said resistors 50–57 to transistors 20–27 decreases at approximately the same rate as the current increases through resistor 40–47 and the winding 33.

Thus, a relatively constant voltage is applied by winding 33 to the emitters of transistors 20–27 for the remainder of the time that transistor 30 stays in saturation. To terminate the output step at terminal 11 before transistor 30 comes out of saturation, a positive voltage is applied through capacitor 68 and resistor 69 sufficient to cut off transistor 30 and thereby remove the drive from transistors 20–27. As transistor 30 and transistors 20–27 cut off, the circuit returns to the condition that existed before the application of the pulse at terminal 10, the capacitors 15 and 16 being recharged as avalanche transistor 12 returned to its quiescent state.

In summary, the operation of the invention is to use the voltage pulse at collector 13 as an input to the amplifier comprised of mixer transistors 20–27 and as a trigger for the blocking oscillator comprised of transistor 30 and transformer 34. The blocking oscillator, when triggered, produces a current pulse having a slower rise time but longer duration than said voltage pulse to drive the amplifier so as to maintain the amplifier output at the level established by the application of the voltage pulse. The output is terminated by removing the current pulse.

The following component values for the circuit shown in the drawing give a specific example of a step function generator according to the invention:

| | |
|---|---|
| Transistor **12** | avalanche transistor. |
| Transistor **30** | 2N2476. |
| Transistors **20–27** | 2N743. |
| Capacitor **15** | 200 pf. |
| Capacitor **16** | 36 pf. |
| Capacitor **67** | 150 pf. |
| Capacitor **68** | 5,600 pf. |
| Resistors **40–47, 60, 63** and **69** | 47 ohms. |
| Resistors **50–57** | 270 ohms. |
| Resistor **61** | 10,000 ohms. |
| Resistor **62** | 5 ohms. |
| Resistor **66** (Load) | 50 ohms. |
| $+E_2$ | selected. |
| $-E_1$ | −20 volts. |

Turns ratio—winding 31:winding 32:winding 33 as 3:1:1.

The output step at terminal 11 of the above circuit is a negative 20 volts with a rise-time of less than 2 nanoseconds. It is possible with the circuit to generate a step 20 microseconds long at a pulse repetition frequency of 10 kilocycles.

It is to be understood that the above-described embodiment is merely illustrative of the application of the principles of the invention. Numerous other arrangements may be devised by those skilled in the art without departing from the spirit and scope of the invention as defined by the appended claims.

What is claimed is:

1. A step function generator comprising,
a transistor for producing a pulse by the avalanche thereof in response to a signal applied thereto,
an amplifier responsive to said pulse as a first input, and
means triggered by said pulse to provide a second input to said amplifier, said second input continuing after the decay of said pulse,
whereby the amplifier output is sustained after the decay of said pulse.

2. A step function generator as set forth in claim 1, wherein said means is a blocking oscillator.

3. A step function generator comprising,
means to generate a first pulse,
means triggered by said first pulse to generate a second pulse prior to the termination of said first pulse, said second pulse having a slower rise time but longer duration than said first pulse, and
means responsive to either of said pulses to generate an output level,
whereby a step function output is initiated by said first pulse and sustained by said second pulse.

4. A step function generator as set forth in claim 3, wherein said first-mentioned means is a transistor operating in the avalanche mode and said second-mentioned means is a blocking oscillator.

5. A step function generator comprising,
a first transistor for producing a pulse by the avalanche thereof in response to an input signal,
a blocking oscillator including a second transistor coupled to said first transistor for driving said second transistor to saturation in response to said pulse, and
a mixer transistor in a common base circuit with the emitter thereof coupled to said first transistor and to said blocking oscillator, said mixer transistor being driven to saturation in response to said pulse and maintained in saturation by said blocking oscillator after the decay of said pulse,
whereby a step function is generated by said mixer transistor.

6. A step function generator as set forth in claim 5, including capacitive coupling means between the emitter of said mixer transistor and said first transistor to sustain the level of said step function during the rise of the output current of said blocking oscillator.

7. A step function generator as set forth in claim 5, including further means to cut off said blocking oscillator in response to a terminating pulse thereby to terminate said step function.

8. A step function generator comprising,
a transistor, a capacitor connected by one terminal to the collector thereof to cause the occurrence of avalanche operation therein in response to an input signal applied at its base,
a blocking oscillator transistor having its base connected to a source of fixed potential and its emitter coupled to the collector of said transistor, the avalanche operation of said transistor driving said blocking oscillator transistor into saturation, said blocking oscillator transistor further having an emitter circuit thereof inductively coupled to its collector circuit to maintain said transistor in saturation after the effect of said avalanche operation is dissipated, and
a mixer transistor having its base connected to said source of fixed potential and its emitter to the other terminal of said capacitor, said mixer transistor being switched into saturation by the avalanche operation of said transistor, said mixer transistor further having an emitter circuit inductively coupled to the collector circuit of said blocking oscillator transistor, thereby to cause said mixer transistor to be held in saturation by said blocking oscillator transistor, and whereby an output signal at the collector of said mixer transistor is initiated by the avalanche operation of said transistor and maintained by the drive of said blocking oscillator transistor after the effect of said avalanche operation is dissipated.

9. Each and every novel feature or novel combination of features disclosed or described herein.

No references cited.

JOHN W. HUCKERT, *Primary Examiner.*

A. J. JAMES, *Assistant Examiner.*